United States Patent Office 2,872,450
Patented Feb. 3, 1959

2,872,450

THIO- AND DITHIO-CARBOXYLIC ACID ESTERS AND A PROCESS FOR THEIR MANUFACTURE

Klaus Sasse, Koln-Stammheim, Richard Wegler, Leverkusen, and Ferdinand Grewe, Koln-Stammheim, Germany, assignors to Farbenfabriken Bayer Aktiengesellschaft, Leverkusen, Germany, a corporation of Germany No Drawing. Application December 4, 1956
Serial No. 626,080

Claims priority, application Germany December 6, 1955

2 Claims. (Cl. 260—281)

This invention relates to and has as its objects thio- and dithiocarboxylic acid esters of the following formula:

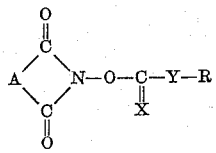

in which A stands for a radical of an organic dicarboxylic acid having preferably two to three carbon atoms between the two

groups and where the chain of two to three carbon atoms may also be interupted by hetero atoms such as O, S, N and the like, X and Y stand for either O or S, at least one of them being S— and R stands for alkyl or aryl radicals.

It has been found that outstandingly active fungicides, which are surprisingly not phytotoxic, are obtained by reacting cyclic oximides with mono- or dithio-carboxylic acid ester halides, especially chlorides.

Suitable cyclic oximides are those of aliphatic dicarboxylic acids which may also contain hetero atoms such as oxygen, sulphur, nitrogen and the like in the chain, as well as oximides of aromatic, hydroaromatic or heterocyclic dicarboxylic acids, which may also carry further substituents such as halogen atoms or alkyl, alkoxy or nitro groups.

These oximides may be represented by the following formula:

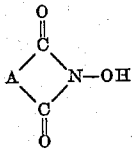

in which A has the same significance as described above. Without restricting this application in any way there may be named as special examples the oximides of the following acids: succinic acid, propan-1,3-dicarboxylic acid, thiodiglycolic acid, imino diacetic acid, citric acid, hexane-1,2-dicarboxylic acid, pentane - 1,2 - dicarboxylic acid, phthalic acid, homophthalic acid, tetrahydrophthalic acid, napthalic acid, pyridine-2,3-dicarboxylic acid, substituted phthalic acids such as chloro, bromo, nitrophthalic acids and the like.

Suitable monothiocarboxylic acid ester chlorides are those which can be prepared by reacting thiophosgene with aliphatic, aromatic, hydroaromatic, or heterocyclic alcohols and phenols, or by reacting phosgene with mercaptans or thiophenols. Dithiocarboxylic acid ester chlorides are formed from thiophosgene and mercaptans or thiophenols. All these thio- and dithio-carboxylic acid ester chlorides may also carry any further desired substituents.

Generally the thiocarboxylic acid ester halides may be represented by the following formula:

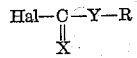

in which X, Y and R have the same significance as described above and Hal stands for halogen, especially chlorine. As examples there may be mentioned: thio- or dithio-carboxylic ester-chlorides, in which the ester radical may be methyl, ethyl, propyl, isopropyl, butyl, amyl, hexyl, cyclohexyl, phenyl, 4-chlorophenyl, 4-nitrophenyl, naphthyl, and the like. It has been understood, however, that these compounds are given only to illustrate the invention without restricting it in any way thereto.

The reaction of cyclic oximides and thio- or dithiocarboxylic acid ester chlorides to give the corresponding thio- or dithio-carboxylic acid esters of cyclic oximides is effected by adding suitable acid binding agents such as sodium hydroxide, sodiumcarbonate, potassiumcarbonate, ammonia, suitable tert. amines and the like. The reaction also may be carried out by dissolving a salt of the oximide, preferably the sodium salt, in water; or by dissolving the free oximide in the calculated amount of caustic soda lye, or in a calculated or excess amount of another basic aqueous solution (soda, for example), or in a tertiary amine, and subsequently adding dropwise the mono- or dithio-carboxylic acid ester chloride, undiluted or dissolved in a water-miscible inert solvent (acetone, for example), whereby the solid oximide- thio- or dithio-carboxylic acid ester precipitates out. The reaction may also be carried out in inert organic solvents such as alcohols, ketones with the sodium compound of the oximides in solution or suspension or with the addition of acid binding agents such as tertiary organic bases. The reaction usually proceeds at room temperature or slightly elevated temperatures. But lower temperatures (from about 0° C.) and higher temperatures (up to about 100° C.) may sometimes have to be applied for successful action. The reaction of phthalic acid oximide with dithio-carboxylic acid ethylester chloride may illustrate the process:

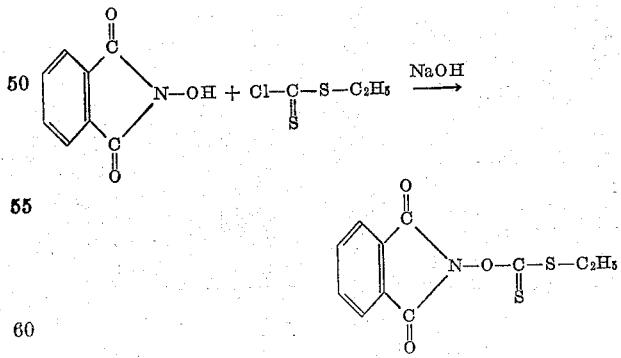

Fungi, such as *Plasmopara viticola, Pseudopeziza thratheifilia, Septoria apii, Phytophthera infestans and Venturia inaequalis*, may effectively be killed by the new compounds of the present invention. The compounds generally may be applied in combination with suitable diluents, or solvents, or solid inert carriers such as water, if necessary with commercial emulsifiers, lower aliphatic alcohols, hydrocarbons, chlorinated hydrocarbons and talc, chalk, bentonite, clay and the like. Usually they may be present in an amount from about 0.1 to about 1% of active ingredient in such carriers or diluents. This figure, however, may vary and compositions containing up to 50% of active ingredients may sometimes also be applied. The active ingredient necessary to give effectiveness varies with the plants to be protected. Potatoes e. g. usually may be treated in an amount of 1 to 3 kg. per hectare. If trees and vineyards have to be treated, the effective amount should be increased.

The following examples are given for the purpose of illustrating the invention.

Example 1

33.4 grams (0.2 mol) of $\Delta^4$-tetrahydrophthaloxime are dissolved in 400 millilitres of dioxane and treated with 20 grams of pyridine. At 0° C., 27.5 grams (0.22 mol) of thio-carboxylic acid ethylester chloride are added dropwise with stirring. After stirring for two hours at room temperature, the mixture is poured into water and the crystals thereby separated are recrystallized from alcohol. The yield after recrystallization is 32 grams (i. e. 62.7 percent of the theoretical) of N-(thiocarbethoxy)-oxy-$\Delta^4$-tetrahydrophthalimide of M. P. 96–97° C.

Example 2

32.6 grams (0.2 mol) of phthaloxime are dissolved in a solution of 21.2 grams (0.2 mol) of anhydrous soda in 500 millilitres of waters and treated dropwise with stirring and cooling with cold water with a solution of 27.5 grams (0.22 mol) of thio-carboxylic acid ethylester chloride in 100 millilitres of acetone. After stirring for 2 hours at room temperature, the separated crystals are isolated and recrystallized from alcohol. The yield after recrystallization is 30.5 grams (i. e. 59.8 percent of the theoretical) of N-(thio-carbethoxy)-oxy-phthalimide of M. P. 118–119° C.

Example 3

35.8 grams (0.2 mol) of $\Delta^4$-tetrahydro-endomethylene-phthaloxime are dissolved in 400 millilitres of acetone and treated with 20 grams of pyridine. At 0° C., 27.5 grams (0.22 mol) of thio-carboxylic acid ethylester chloride are added dropwise with stirring, and stirring is continued at room temperature for a further 2 hours. The crystals precipitating after pouring the mixture into water are recrystallized from alcohol. The yield is 35.5 grams (i. e. 66.5 percent of the theoretical) of N-(thiocarbethoxy) - oxy - $\Delta^4$-tetrahydroendomethylene-phthalimide of M. P. 150–151° C.

Example 4

17.9 grams (0.1 mol) of $\Delta^4$-tetrahydro-endomethylene-phthaloximide are dissolved in 250 millilitres of dioxane and, after the addition of 13 grams of pyridine, treated dropwise with a solution of 17.25 grams (0.1 mol) of thiocarboxylic acid phenylester chloride in 50 millilitres of dioxane, with stirring and slight cooling. Stirring is continued at room temperature for 1 hour and at 40–50° C. for another hour. After cooling, the reaction mixture is poured into water. The initially oily product crystallizes after a short time and is recrystallized from ligroin. The yield is 28 grams (i. e. 89.4 percent of the theoretical) of N - (thiocarbophenoxy)-oxy - endomethylene-$\Delta^4$-tetrahydrophthalimide of M. P. 87–91° C.

Example 5

16.7 grams (0.1 mol) of $\Delta^4$-tetrahydropthaloxime are dissolved in 250 millilitres of dioxane, treated with 13 grams of pyridine and reacted dropwise with stirring and slight cooling with 17.25 grams (0.1 mol) of thiocarboxylic acid phenylester chloride. Stirring is continued for an hour at room temperature and for 1 hour at 40–50° C. The mixture is poured into water and the precipitating crystals are recrystallized from ligroin. The yield is 26.7 grams (i. e. 88.1 percent of the theoretical) of N-(thiocarbophenoxy)-oxy - $\Delta^4$ - tetrahydrophthalimide of M. P. 83–84° C.

Example 6

21.3 grams (0.1 mol) of napthaloxime are suspended in 250 millilitres of dioxane and treated with 14 grams of hexahydrodimethylaniline. 13.7 grams of thiocarboxylic acid ethylester chloride are slowly added drop by drop with stirring and cooling with cold water, whereby hexahydromethylaniline hydrochloride separates out after a short time. The mixture is stirred for ½ hour at room temperature and for ½ hour at 40–45° C. and after cooling poured into 1 to 1½ litres of water without isolating the precipitate formed. The precipitated crystals are recrystallized from acetic acid ester. The yield is 23 grams, i. e. 76.5 percent of the theoretical, of N-(thiocarbethoxy)-oxy-naphthalimide of M. P. 173° C.

Example 7

16.7 grams (0.1 mol) of tetrahydrophthaloxime are dissolved in a solution of 4 grams of sodium hydroxide in 150 millilitres of water and treated dropwise at room temperature with stirring and slight cooling with a solution of 12.2 grams of thio-carboxylic acid methylester chloride in 25 millilitres of acetone. After stirring for another half hour at room temperature, the separated crystals are isolated and recrystallized from alcohol. The yield is 9.7 grams, i. e. 40 percent of the theoretical, of N-(thio-carbethoxy)-oxy-$\Delta^4$-tetrahydrophthalimide of M. P. 104–105° C.

Example 8

17.8 grams (0.1 mol) of hexahydrophthaloxime are dissolved in a solution of 4 grams (0.1 mol) of sodium hydroxide in 200 millilitres of water and treated dropwise with stirring and slight cooling with a solution of 13 grams of thiocarboxylic acid ethylester chloride in 50 millilitres of acetone. After stirring at room temperature for an hour, the separated crystals are isolated and recrystallized from alcohol. The yield is 15.3 grams, i. e. 59.5 percent of the theoretical, of N-(thio-carbethoxy)-oxy-hexahydrophthalimide of M. P. 56–58° C.

Example 9

8.4 grams (0.05 mol) of $\Delta^2$-tetrahydrophthaloxime are dissolved in a solution of 2 grams of sodium hydroxide in 150 millilitres of water and treated dropwise with stirring at room temperature with a solution of 6.3 grams of thiocarboxylic acid ethylester chloride in 20 millilitres of acetone. After stirring at room temperature for ½ hour, the crystals are filtered off with suction and recrystallized from alcohol. The yield is 8.5 grams, i. e. 66.5 percent of the theoretical, of N-(thio-carbethoxy)-oxy-$\Delta^2$-tetrahydrophthalimide of M. P. 95° C.

Example 10

8.9 grams (0.05 mol) of homophthaloxime are dissolved in a solution of 2 grams of sodium hydroxide in 100 millilitres of water and treated dropwise with stirring at room temperature with a solution of 6.3 grams of thiocarboxylic acid ethylester chloride in 20 millilitres of acetone. After stirring for ½ hour, the crystals are filtered off with suction and recrystallized from alcohol. The yield is 7.5 grams, i. e. 56.5 percent of the theoretical, of N-(thio-carbethoxy)-oxy-homophthalimide of M. P. 127–128° C.

Example 11

17.9 grams (0.1 mol) of $\Delta^4$-tetrahydro-endomethylenphthaloxime are dissolved in 200 millilitres water containing 4 grams sodium hydroxide at room temperature and while stirring there is added a solution of 14 grams thiocarbonicacid propyl ester in 50 millilitres acetone. Stirring is continued for 15 minutes at room temperature and the solution then is filtered off with suction. After recrystallisation from alcohol there are obtained 16 grams of N-(thio-carbopropoxy)-oxy-$\Delta^4$-tetrahydro-endomethylene-phthalimide of M. P. 119–120° C. (57 percent of the theoretical).

We claim:
1. Thio- and dithio-carboxylic acid esters of cyclic oximides of the formula

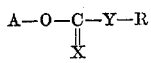

in which A is a member of the group consisting of N-phthalimido, N-naphthylimido, N-homophthalimido, N-endomethylene-phthalimido, the ring-hydrogenated forms of these radicals, nitro-substituted N-phalimido, bromo-substituted N-phalimido, and chloro-substituted N-phthalimido; X and Y stand for members selected from the group consisting of oxygen and sulphur, at least one of them being sulphur; and R is a member selected from the group consisting of methyl, ethyl, propyl, isopropyl, butyl, amyl, hexyl, cyclohexyl, phenyl, 4-chlorophenyl, 4-nitrophenyl, and naphthyl.

2. A process for the production of thio- and dithio-carboxylic acid esters of cyclic oximides of the formula

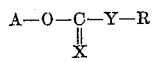

in which A is a member of the group consisting of N-phthalimido, N-naphthylimido, N-homophthalimido, N-endomethylene-phthalimido, the ring-hydrogenated forms of these radicals, nitro-substituted N-phalimido, bromo-substituted N-phalimido, and chloro-substituted N-phthalimido; X and Y stand for members selected from the group consisting of oxygen and sulphur, at least one of them being sulphur; and R is a member selected from the group consisting of methyl, ethyl, propyl, isopropyl, butyl, amyl, hexyl, cyclohexyl, phenyl, 4-chlorophenyl, 4-nitrophenyl, and naphthyl, which comprises reacting a compound of the formula

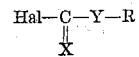

in which X, Y and R have the same significance as described above, and Hal stands for a halogen selected from the group consisting of chlorine and bromine, with a cyclic oximide of the formula

in which A has the same significance as described above, in the presence of an acid binding agent, and at a temperature of 0°–100° C.

No references cited.